INVENTOR

EIJIRO TOMIYAMA

BY Marshall and Yeasting [signature]

ATTORNEYS

MANUALLY OPERATED SOUND REPRODUCING DEVICE

Filed March 15, 1967 2 Sheets-Sheet 2

INVENTOR
EIJIRO TOMIYAMA

BY Mawhew and Torren
ATTORNEYS

United States Patent Office 3,479,037

Patented Nov. 18, 1969

3,479,037

MANUALLY OPERATED SOUND REPRODUCING DEVICE

Eijiro Tomiyama, 10, 9, 7-chome, Tateishi, Katsushika-ku, Tokyo, Japan

Filed Mar. 15, 1967, Ser. No. 623,275
Int. Cl. G11b *25/04, 25/06*
U.S. Cl. 274—9 6 Claims

ABSTRACT OF THE DISCLOSURE

A manually operated sound reproducing device is formed of a turntable supporting a record disc mounted within a frame. A sound cone is supported within the frame and a tone-arm is disposed in contact with the apex of the sound cone and has a stylus arranged to trace a sound groove in the record disc. The tone-arm is biased to return the stylus to the starting point of the sound groove after completely tracing the groove in the record disc. The turntable is driven by a gear and shaft arrangement arranged to rotate the turntable in one direction only.

SUMMARY OF THE INVENTION

This invention relates to a sound reproducing device, and more particularly to a manually operated sound reproducing device comprising means for turning a record, a tone-arm having at its tip portion a stylus which traces the sound grooves of the record, and a vibration cone for emitting the sound reproduced and transmitted by the stylus, and characterized in that when the device is manually operated, the stylus is automatically set on the starting point of the sound grooves to reproduce the recorded sound, and when the stylus has finished tracing of the grooves it is automatically returned with the tone-arm to its starting position, for replaying the record.

It is one object of the present invention to provide a manually operated device capable of repeatedly replaying a recorded sound, which can be mounted in or on any toys designed for emitting sound using a record, such as talking dolls, miniature toy television sets, music playing vehicles and the like.

It is another object of the present invention to provide a manually operated miniature sound reproducing device which can be used as a portable record player.

It is a further object of the present invention to provide a device of the kind described above which can be manufactured and sold at a reasonable cost.

It is a still further object of the present invention to provide a device of the character described which is simple in operation and can be easily handled by children.

The features of the present invention which are believed to be novel are set forth with particularity in the appended claims. This invention itself, both as to its organization and manner of operation, together with further objects and advantages thereof, may be best understood by reference to the following description taken in connection with the accompanying drawing in which:

In the drawings:

In FIGURES 1 to 4, like portions or parts are designated with like numerals.

DETAILED DESCRIPTION OF THE INVENTION

Figures 1, 2:
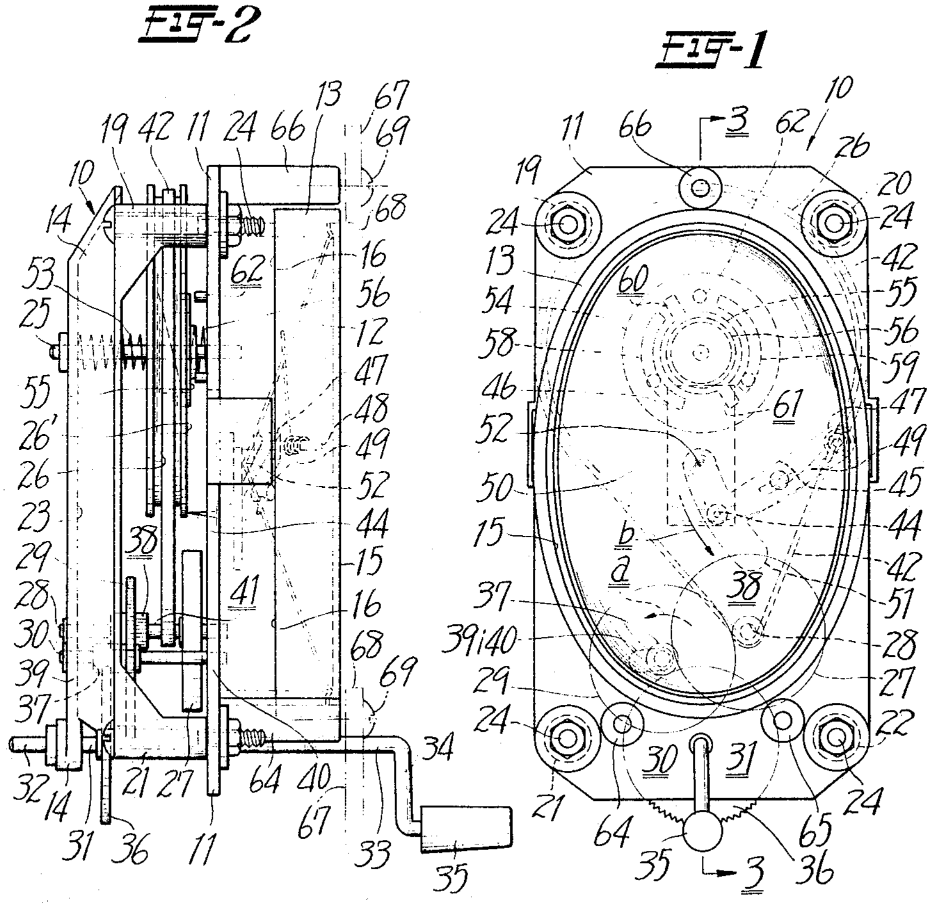
FIGURE 1 is a front view of one embodiment of the present invention.
FIGURE 2 is a side view of the embodiment shown in FIGURE 1.
Figure 3:
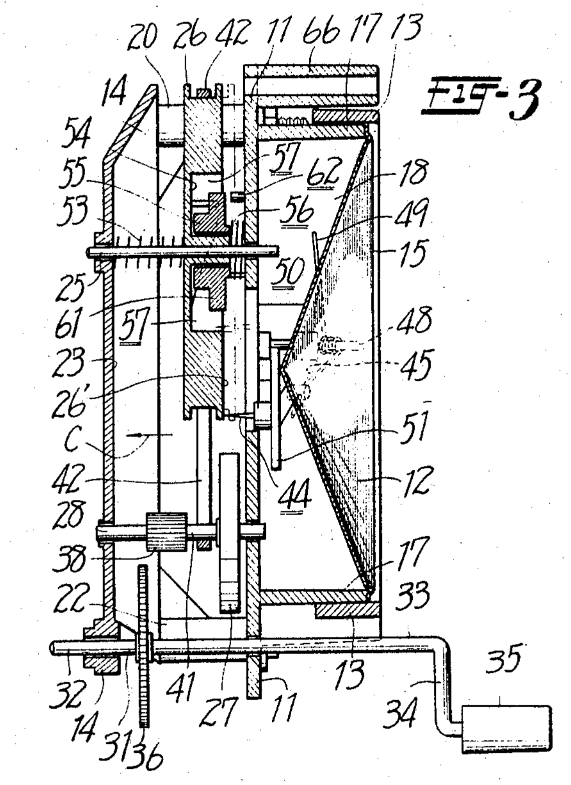
FIGURE 3 is a longitudinal sectional view taken along the line 3—3 in FIGURE 1

Referring to the drawing, the device 10 comprises, as shown in FIGURES 1 to 3, a base plate 11, a frame 13, a support plate 14, a sound cone 12, a turntable 26 or pulley with a record disk, a tone-arm 45 having a stylus 44, and a manual handle 35 for cranking the device etc.

The frame 13 is, as illustrated in FIGURE 1, of elliptic form and has front and rear open sides 15 and 16, and adjacent its front side it supports the sound cone which has its apex directed toward the base plate 11. The frame 13 is mounted on the periphery of an elliptic frame 17 located forwardly of the base plate 11. The sound cone 12 is made of plastic film having a suitable hardness. As shown in FIGURE 3, this sound cone 12 in combination with the base plate and the elliptic frame 17 form a resonant chamber 18.

The support plate 14 is shaped something like a rectangular dish and is provided at its four corners with supporting posts 19, 20, 21 and 22. The support plate is secured to the base plate 11, through the medium of the posts, by means of screws 24 which axially pass through the posts. Shafts 25, 28, 30 and 31 extend transversely of and are movably fitted through a back plate 23 of the support plate 14 and the base plate 11. Shaft 25 is a turntable shaft, shaft 28 is a drive shaft, shaft 30 is an intermediate axially movable shaft, and shaft 31 is a drive shaft. A grooved pulley or turntable 26 is mounted on the shaft 25. A flywheel 27 and a pinion 38 are fitted on the shaft 28. A gear wheel 29 and a pinion 37 are mounted on the shaft 30. The driving shaft 31 has at one end a straight free end 32 and its other end 33 forms a crank 34 having a handle grip 35. On the driving shaft, adjacent to the internal surface of the back plate 23, is a driving wheel 36 which is in mesh with the pinion 37 on the movable shaft 30. The toothed wheel 29 of the movable shaft is brought into engagement with the pinion 38 on the drive shaft 28 for rotating the shaft 28 only when the movable shaft 30 is driven in the direction indicated by the arrow *a*, see FIGURE 1. The movable shaft 30 is movably secured at its ends within slot bearings 39 and 40 located in the back plate 23 and the base plate 11, respectively. Due to the mounting of the gear or toothed wheel 29 within the slot bearings 39, 40, the wheel 29 is biased against the pinion 38 on the drive shaft 28 only when the movable shaft 30 is driven in the direction indicated by the arrow *a* by the driving wheel 36 of the driving shaft 31.

When the driving shaft 31 rotates in the opposite direction, the driving wheel 36 contacts the pinion 37 and the shaft 30 is displaced in the slot bearings 39, 40 with the toothed wheel becoming disengaged from the pinion 38 and thus preventing the reverse rotation of the pulley 26. When the rotation of the driving shaft 31 is stopped, the toothed wheel 29 is adapted to disengage from the pinion 38, since the drive shaft 28 continues to rotate due to the inertia produced by the rotation of the flywheel 27, and the pinion 38 acts so as to push back the toothed wheel 29 with the shaft 30 being displaced within the slot bearings 39, 40. The drive shaft 28 is suitably roughened at its intermediate portion 41 between the pinion 38 and the flywheel 27 so that a belt 42 which drives the pulley 26 will not slip. Because of the inertia produced by the rotation of the flywheel 27, the turntable 26 will continue to rotate for a period of time after the rotation of the shaft 31 is stopped and the record will continue to play during this period of time.

Figure 4:
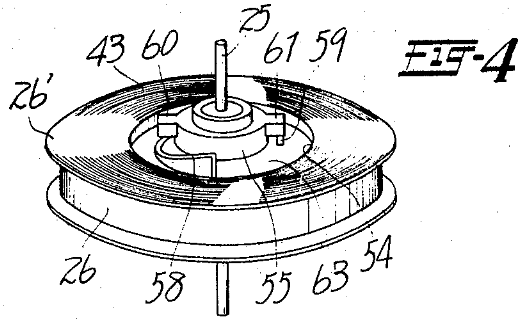
FIGURE 4 is a perspective view of the disk structure employed in the embodiment.

As shown in FIGURE 4, the pulley 26 is provided on its front surface with a disk 26' having a spiral shaped sound groove 43 arranged to be traced by the stylus 44. In the embodiment illustrated, the disk 26' is integrally formed with the pulley 26, but it may, of course, be so designed as to be replaceably mounted on said pulley, if desired. The stylus 44 is planted on the tip of the T-shaped tone-arm 45, see FIG. 1, situated in the resonant chamber 18 and loosely pressed against the record disk 26' through a rectangular aperture 46 formed in the central portion of the base plate 11. The tone-arm 45 is pivotally supported at its base 47 by a pivot pin 48, which is affixed on the base plate, and is always urged in the direction indicated by the arrow *b*, see FIG. 1, by means of spring 49 coiled at one end around the pivot pin 48. As shown in FIGURE 1, the tone-arm 45 has wing-like portions 50, 51 which are normally in frictional sliding contact with the apex 52 of the sound cone 12 and which functions as a vibration transmitter to the sound cone. Accordingly, as the sound grooves 43 of the disk 26' are traced by the stylus 44, and the tone-arm rides inwardly toward the shaft 25 the vibration of the stylus produced is transmitted by the wing-like portions in contact with the sound cone 12, thus permitting the cone to emit ample sound. The sound thus reproduced is further amplified by the action of the resonant chamber 18.

The pulley or turntable 26 is rotatably mounted on the shaft 25 and is urged in the direction of the stylus 44 by means of a coil spring 53 axially mounted on said shaft. The turntable has, in its central portion, an annular recess portion 54 arranged to receive a circular block 55 which is slidably and rotatably mounted on the shaft 25 and which is urged towards the turntable 26 by means of a coil spring 56. The spring action of this spring 56 is weaker than that of coil spring 53 whereby the pulley 26 is normally kept pressed against the stylus 44 in the playing position for transmitting sound from the sound cone.

In the annular space 57 formed between the circumferential wall of the recess portion 54 and the rotatable block 55 is positioned a pair of arcuately shaped fixed cams 58, 59 having generally inclined upper surfaces as shown in FIGURE 4. The rotary block 55 is cylindrical in shape and on its periphery it has a pair of outwardly extending diametrically opposed projections 60, 61 adapted to run on the inclined upper surfaces of the cams 58, 59. A stopper member 62 extends from the surface of the base plate 11 toward the opposite surface of the turntable 26. This stopper 62 is engageable with the projections 60, 61 to stop the rotation of the block member 55 when the stylus 44 has completed a cycle through the groove 43 and the tone-arm 45 and stylus are displaced into the recess portion 54.

DESCRIPTION OF THE OPERATION OF THE INVENTION

In operation, when the handle 35 of the crank 34 is manually operated, the drive shaft 31 is rotated and by means of the interengaged gear member on the shafts 28, 30 and 31, the belt 42 rotates the turntable or pulley 26 and the stylus 44 set on the starting point of the sound grooves 43 of the disk 26' starts tracing the grooves to reproduce the recorded sound.

As the stylus 44 finishes the tracing of the grooves at the terminal thereof, the tip portion of the stylus is forced to fall into the space 57 in recess portion 54 of the pulley 26, and then, with the tip portion located in the recess portion, the pulley 26 is forced by means of a coil spring 53 toward the base plate 11 and continues to rotate with the block 55. The chain line in FIGURE 3 indicates the displaced portion of the pulley 26. In this position, the projections 60, 61 on the block 55 is brought into engagement with stopper 62, which is provided on the rear surface of the base plate 11, to stop the rotation of said block independently of the rotation of the pulley 26. As a result, the projections 60, 61 are disposed in contact with the inclined surfaces of the cams 58, 59 on the pulley which continues to rotate and causing the block 55 to push the pulley 26 in the direction indicated by the arrow *c*, see FIG. 3, against the action of the coil spring 53, thus releasing the stylus 44 out of the annular space 57 on the pulley 26. As the stylus is released out of said groove, the tone-arm 45 is returned by means of the spring 49 to its starting position, namely, the starting point of the sound grooves 43 of the disk 26'. When the pulley 26 is slightly rotated further by cranking the projections 60, 61 are released from the inclined surfaces of the cams 58, 59 and drop by the action of the spring 56 into the recess portion 54 of the pulley 26 into the discontinuous portions 63 formed between the cams 58, 59. As a result, the projection 60 or 61 in engagement with the stopper 62 of the base plate 11 is disengaged therefrom, thereby enabling the record to be replayed. Thus, the device as described according to the present invention, is capable, by manual operation, of mechanically continuously replaying of the record disk.

As previously described, this device can be mounted either in the inside of or on the outside of body or casing of toys. When securing the device to toys, the posts 64, 65 and 66 provided on the front surface of the base plate 11 may be utilized for this end. In case the device is mounted inside of a toy, it is desirable that the device is attached by means of the screws 69, 69 and that the cone 12 is directed towards a sound releasing opening 68 of the toy 67 (see FIGURE 2).

It is noted that the provision of the flywheel 27 enables the pulley 26 to be rotated at a constant speed and eliminates the so-called wow and flutter.

Thus, the various objects of the present invention as aforementioned may be effectively attained by the features and advantages of the device as hereinbefore described.

What I claim is:

1. A manually operated sound reproducing device comprising a frame, said frame comprising a base plate and a support plate disposed in spaced oppositely facing relationship, said base plate having an opening therethrough spaced inwardly from the periphery of said base plate, a shaft extending between and being rotatably supported by said base plate and support plate, a turntable being mounted on said shaft between said base plate and support plate and being axially displaceable thereon, a record disk being positioned on the face of said turntable directed toward said base plate and having a spiral shaped sound groove therein, a sound cone being supported on said base plate on the opposite side thereof from said support plate and the apex of said sound cone being directed toward and adjacent to said base plate, a tone-arm pivotally mounted on said base plate on the same side thereof as said sound cone for pivotal movement in a plane parallel with said record disk, a stylus being affixed to said tone-arm at a point spaced from a point at which said tone-arm is pivotally mounted to said base plate, said stylus being arranged to extend through the opening in said base plate into contact with the sound groove in said record disk, said tone-arm having a part thereof in frictional sliding contact with the apex of said sound cone for transmitting vibrations to said sound cone when said stylus travels through the sound groove in said record disk, a first spring means for pivotally biasing said tone-arm to a position wherein said stylus is located at the starting point of the sound groove in said record disk, a second spring means for biasing said turntable on said shaft toward said base plate, an annulur recess being formed in the face of said turntable directed toward said base plate and being centrally disposed about said shaft, said recess being arranged to receive said stylus therein when said stylus has completed tracing the sound groove in said record disk, said second spring means displacing said turntable axially toward said base plate when said stylus drops into said recess thereby retaining the stylus and tone-arm in said recess against the returning action of said first spring means, means for axially displacing said turntable toward said support plate and thereby releasing said stylus from said recess for return to the starting point of the sound groove on said record disk under the action of said first spring means, said means for axially displacing said turntable comprising a block rotatably and axially displaceably mounted on said shaft and positionable within said recess portion of said turntable with the radially outer periphery thereof spaced inwardly from the radially outer periphery of said recess portion, cam means being attached to said turntable within said recess portion, said block being arranged for selectively contacting said cam means, a stopper being attached to and extending from said base plate and facing toward said turntable, said stopper being arranged to extend into said recess portion into the path of travel of said block, and a manually operable driving mechanism being positioned in said frame and in operative engagement with said turntable for rotating said turntable.

2. A device as set forth in claim 1, wherein said cam means comprises a pair of arcuate cam members concentrically disposed in said annular recess portion of said turntable disposed radially outwardly from said block, the surfaces of said cams facing toward said base plate having a sloping surface whereby one circumferential end of said surface is closer to said base plate than the other circumferential end thereof, said block having a cylindrical shape and being provided with a pair of diametrically opposed projections extending radially outwardly toward said cam members, a third spring means being mounted about said shaft between said base plate and said block for biasing said block toward said turntable, the spring action of said second spring means being stronger than that of said third spring means, said projections on said block being adapted to be disposed in contacting relationship with the sloping surfaces of said cam members when said stylus is displaced within said annular recess portion whereby said turntable is displaced in the axial direction toward said support plate and said stylus and tone-arm are released from said recess portion for return to the starting point of the sound groove in said record disk under the biasing action of said first spring means.

3. A device, as set forth in claim 2, wherein the circumferential ends of said cam members are spaced apart for forming open spaces therebetween, said projections on said block being arranged to drop into the open space between the circumferential ends of said cam members after the completion of their travel on the inclined surfaces of said cam members whereby one of said projections is displaced from said stopper and said turntable is axially displaceable under the action of said second spring means toward said base plate into position for transmitting vibrations from said record disk by means of said stylus and tone-arm to said sound cone.

4. A device, as set forth in claim 1, wherein said driving mechanism comprises a manually operable crank member, a gear train mounted within said frame and in driving connection with said crank mechanism, and a drive belt operatively connected to said gear train and being arranged to drive said turntable on said shaft.

5. A device, as set forth in claim 1, wherein said driving mechanism comprises a drive shaft mounted in said frame, a crank handle mounted on one end of said drive shaft and being arranged for rotating said drive shaft, a gear wheel mounted on said drive shaft, a second shaft mounted within said frame adjacent said drive shaft, a pinion member being arranged on said drive shaft and in interengaged relationship with said gear wheel on said drive shaft, a gear wheel mounted on said second shaft, said second shaft being positioned in slotted bearings in said base plate and said support plate, a third shaft being mounted in said frame in parallel relationship with said second shaft, a pinion member mounted on said third shaft and being in interengaged relationship with said gear wheel on said second shaft, said second shaft being arranged within said slotted bearings for displaceably positioning said gear wheel from said pinion on said third shaft, and a belt member being arranged on said third shaft and being fitted within the periphery of said turntable for driving said turntable when said crank handle on said drive shaft is rotated in one direction.

6. A device, as set forth in claim 5, wherein a flywheel is mounted on said third shaft and being arranged to rotate said turntable at a constant speed and arranged to continue the rotation of said turntable when the manual rotation of said drive shaft is discontinued, and the continued rotational action of said flywheel causing said pinion on said third shaft to displace said gear wheel on said second shaft into a disengaged position by displacing said second shaft within said slot bearings.

References Cited

UNITED STATES PATENTS

| | | | |
|---|---|---|---|
| 2,379,560 | 7/1945 | Barnes | 274—15 |
| 2,886,328 | 5/1959 | Duncan | 274—1 |
| 3,017,187 | 1/1962 | Ryan | 274—14 |
| 3,073,605 | 1/1963 | Mennie | 274—25 |
| 3,235,266 | 2/1966 | Scoparino | 274—15 |
| 3,287,020 | 11/1966 | Beebe | 274—1 |

HARRY N. HAROIAN, Primary Examiner